Figure 7:
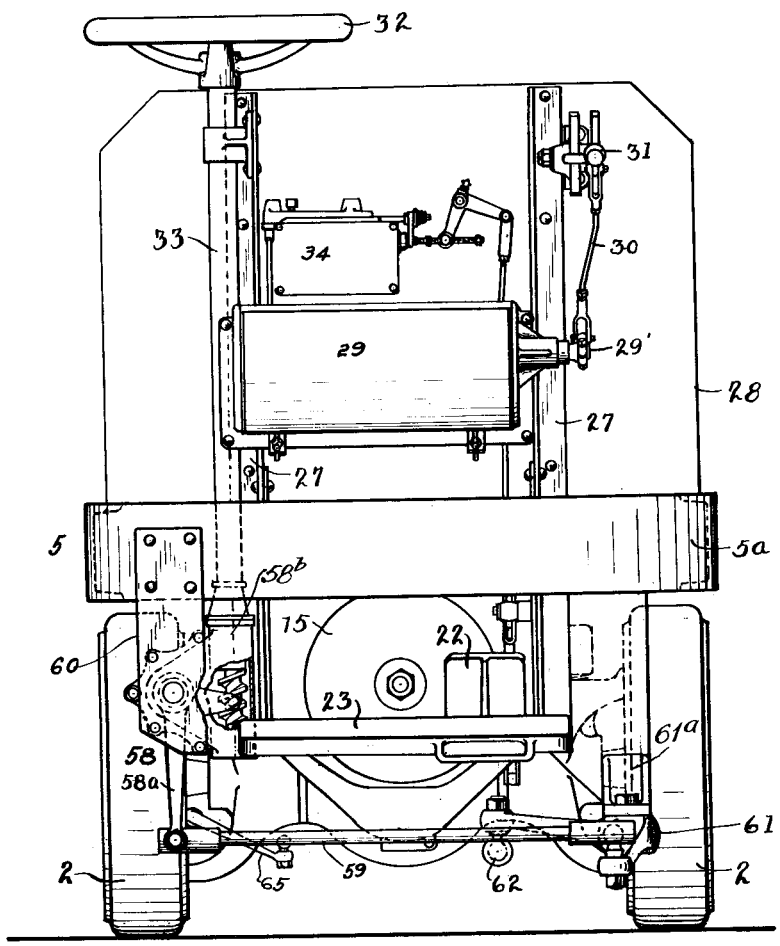

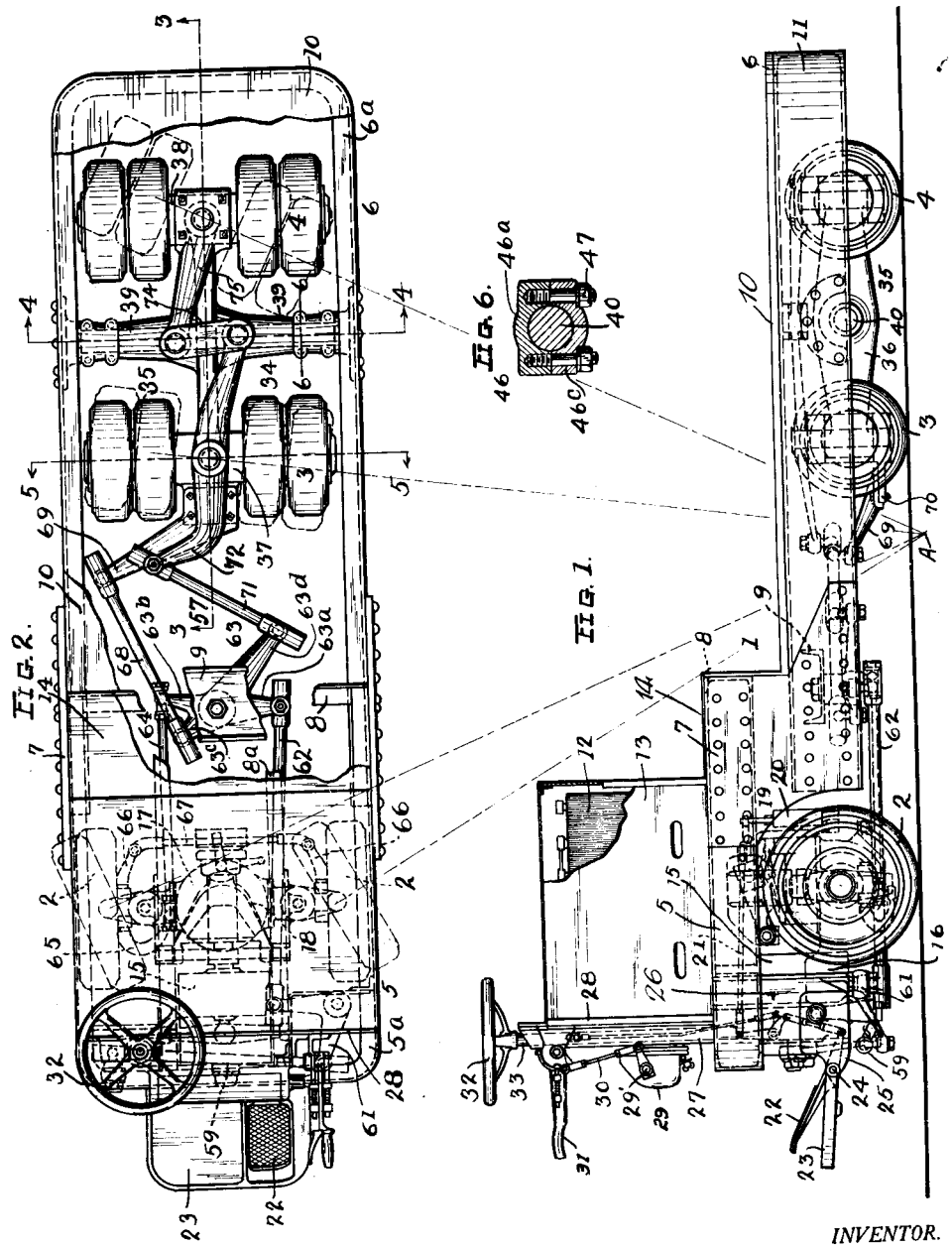

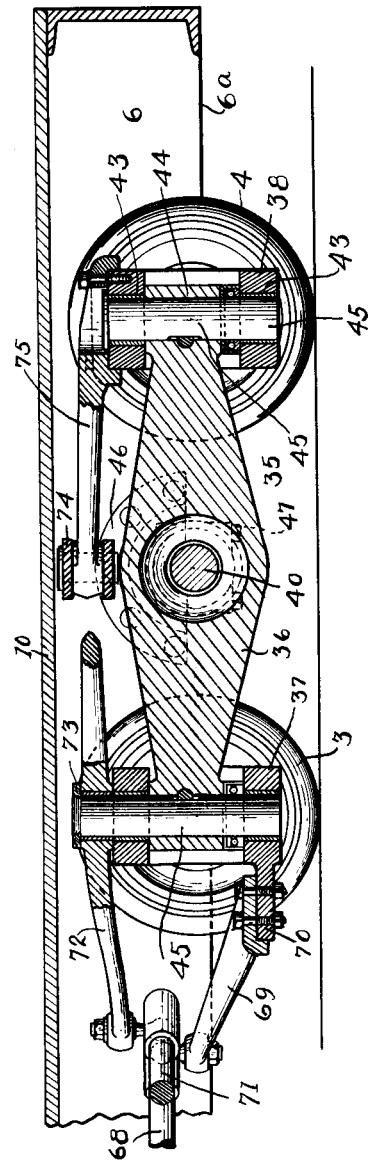

July 18, 1933.  E. H. REMDE  1,919,170
INDUSTRIAL TRUCK
Filed July 9, 1925  3 Sheets-Sheet 3

Patented July 18, 1933

1,919,170

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed July 9, 1925. Serial No. 42,559.

This invention relates to industrial trucks. I have embodied my invention in a truck having at its load carrying end a relatively low platform; for example, a truck of the elevating platform type, tiering type, boom carrying type or utility type, the latter being chosen for illustration herein.

One object of the invention is to construct an industrial truck of large capacity adapting it to readily transport relatively heavy loads.

Another object of the invention is to construct an industrial truck having a plurality of pairs of wheels below the load supporting end of the truck and to provide means for steering such wheels simultaneously to effect ready steering at all times without strain or undue wear on the wheels and their supporting elements, and for turning in a minimum area.

Another object of the invention is to provide in a truck of this type and character having three sets of wheels, a steering mechanism that is relatively simple and easily operated.

Another object of the invention is to construct an industrial truck having a plurality of pairs of steerable wheels below its load supporting end, whereby maximum carrying capacity is provided and the truck may be turned within a relatively small area without projecting the wheels unduly at either side of the truck frame.

A further object of the invention is to construct a truck of this character for relatively heavy loads while maintaining a relatively narrow width of load or lift platform.

Other objects of the invention will be apparent to those skilled in the art to which my invention relates from the following description taken in connection with the accompanying drawings, wherein Fig. 1 is a side elevation of an industrial truck embodying my invention.

Fig. 2 is a plan view of the truck, with parts broken away.

Figs. 3, 4, 5 and 6 are sections on the lines 3—3, 4—4, 5—5 and 6—6, respectively, of Fig. 2.

Fig. 7 is an elevation looking at the driving end of the truck.

In the drawings, 1 indicates as an entirety a frame supported at one end by a pair of traction wheels 2 and at its opposite or load supporting end by sets of trailing wheels 3, 4, to which reference will later be made. The wheels 2, 3, 4, are mounted on knuckles for steering purposes or mounted on axles which are pivoted to effect steering.

The frame 1 preferably comprises a main section 5 and a relatively low or sub-section 6 on which the load is supported, either directly as in the type of truck shown herein or indirectly by means of a movable member, such as a platform or tiering member. Where the frame 1 is of this construction, the wheels 3, 4, are preferably smaller than the traction wheels 2. The sections 5, 6, are rigidly connected by drop plates 7, preferably riveted to the sections in a well known manner. The main section 5 of the frame may be formed from a section of a channel bar 5a bent into substantially U-shape, their free ends being connected by a tie bar 8, which is preferably a channel bar. The tie bar and front section of the channel bar 5a are connected by a pair of parallel bars 8a. The sub-section 6 may be constructed similarly to the section 5 and its ends are connected by a cross member 9 (preferably a channel bar) connected to the side members of the channel bar 6a by a pair of angle plates (not shown), so as to position it in a plane between the flanges of the channel bar 6a.

10 indicates a plate supported on the section 6 and extending from the rear end of the main section to the free end of the sub-section. The plate 10 may serve as a platform for loads. The plate is removably supported on the sub-section 6.

12 indicates a power supply, such as a series of storage batteries. The batteries are protected by a casing 13. The batteries and casing are mounted on the main section 5; that portion of the section between the rear end of the casing 13 and rear end of the section being covered by a plate 14.

15 indicates an electric motor operatively connected through a suitable power transmitting mechanism and axle having live axle sections to the wheels 2 to drive them in a well known manner. The motor 15 is connected to and carried by a cradle 16, which in turn is connected to the housing 17 for the power transmitting mechanism and live axle sections. 18 indicates as an entirety connections between the motor and housing 15 and the main section 5, these connections preferably being of the suspension type such as described and claimed in a co-pending application Serial No. 420,630, filed by John H. Hertner and myself, jointly (see Letters Patent No. 1,628,145, dated May 10, 1927). The axle for the wheels 2 is provided with suitable knuckles by means of which the wheels 2 are mounted to swing, whereby they may be steered as will later be set forth.

19 indicates as an entirety a brake mechanism, which includes a brake wheel fixed to an extended end of the propeller shaft driven by the motor 15 and brake shoes 20 arranged to engage therewith and operated by a linkage 21 connected to a pedal 22; a spring being connected to the linkage and normally operating to apply the brake shoes and raise the pedal 22, so that operation of the pedal downwardly will release the brake and put the spring under tension.

23 indicates a platform on which the operative stands. The platform may be pivoted on a cross shaft 24 mounted in a pair of brackets 25; the brackets in turn are carried by a pair of depending plates 26 secured to a pair of uprights 27. The uprights 27 are secured to the bars 8a. At their upper ends they carry a dash 28.

29 indicates a controller of suitable construction, the shaft of the controller being connected to a countershaft 29', which in turn is connected by an arm and link 30 with a lever 31 pivoted on the dash and swingable upwardly and downwardly.

32 indicates a steering wheel connected to a column or shaft 33. The shaft 33 is mounted in suitable bearings, preferably comprising one or more collars secured to the adjacent upright 27. The connections with the shaft 33 will be later described.

34 indicates as an entirety a switch mechanism operatively connected with the brake mechanism 19 so that the circuit from the batteries 12 to the motor 15 is broken when the brake is applied and closed when the pedal 22 is pushed downwardly and the brake released. As this switch mechanism is not claimed herein but forms the subject-matter of a co-pending application Serial No. 536296, filed February 13, 1922 (see Letters Patent No. 1710071, dated April 23, 1929), further description herein will not be necessary.

35 indicates as an entirety an axle frame comprising a longitudinal section 36 carrying at its opposite ends axles 37, 38, for the sets of wheels 3, 4, respectively, and laterally extending intermediate sections 39. The sections 39 are hollow and aligned to receive a transverse shaft 40 which forms trunnions for the sections 39 to rock on and thus permit the axle frame to rock on a transverse axis, so that the wheels 2, 3, may accommodate themselves to any unevenness of the floor over which the truck is driven. The axles 37, 38, herein shown for illustrative purposes are of the fifth wheel type to effect steering of the wheels 3, 4, but it will be understood that the wheels may be mounted at the ends of the axles on suitable knuckles. In the illustrated form of construction, each axle comprises a hollow center section 41 and oppositely extending spindles 42 on which the wheels 3 or 4 rotate. The upper and lower walls of the center section of each axle 37, 38, are formed with aligned openings 43 and the adjacent end of the longitudinal section 36 of the axle frame extends into or through the center section 41 and is formed with an opening 44 arranged to register with the openings 43 to receive a pin or pintle 45. As shown in Figs. 3 and 5, the pintle extends through the openings 43 and 44 to pivotally connect the axle to the longitudinal section, so that the axle may be turned for steering purposes, as will be later set forth. The opposite ends of the shaft 40 are supported in suitable brackets 46 carried by the side members of the channel bar 6a. Each bracket 46 may comprise an arm 46a having a flange 46b riveted to the side member and a cap 46c secured to the arm by cap screws 47. Each pintle 45 may be keyed or otherwise secured in the opening 44. I prefer to mount on each spindle 42 a pair of wheels 3 or 4 to provide what may be termed dual wheels, each of which is free to rotate on the spindle relative to the other wheel of the pair. As shown in Figs. 2, 4 and 5, the axle mechanism for the sets of trailing wheels is so constructed that the outer faces or edges of the outermost wheels lie within the side walls of the frame 6 and when the axles are turned for steering they do not project beyond the edges thereof (see dotted lines in Fig. 2). Each wheel 3, 4, preferably comprises a hub 48, a rim 49 connected integrally with the hub by a web 50, and a tire 51 fitted to the rim in a well known manner. 52 indicates anti-friction bearings between the spindle 42 and hub 48. The hubs 48 of each pair of wheels are hollowed out to form a shoulder at their inner ends and in assembling the wheels on the adjacent spindle the inner wheel is positioned at the inner end of the spindle so that a collar 52 thereon will engage the adjacent end of the anti-friction bearing; whereas a collar or washer 53 held in place by a nut 54 on the outer end of the spindle, engages the adjacent end of the anti-friction bearing for the outer wheel. 55 indicates a cap connected to the outer face of the hub 48 of the outer wheel of each pair by suitable cap screws and serving to enclose the free end of the adjacent axle and protect the bearings for the wheels.

56 indicates a thrust bearing surrounding each pintle 45 and interposed between the longitudinal section 36 and lower wall of the center section 41 for the adjacent axle, this thrust bearing preferably being of the anti-friction type.

57 indicates as an entirety the steering connections for the wheels 2, 3, 4. Of these connections, 58 indicates a bell crank having a bifurcated arm the ends of which engage a spiral groove formed in a sleeve carried by the lower end of the shaft 33. The other arm 58a of the bell-crank is pivotally connected to one end of a link 59. The bell-crank 58 is fulcrumed in suitable bearings formed in a casing 58b which supports the lower end of the shaft 33 and encloses the grooved sleeve above referred to. The casing is secured to a depending bracket 60. The opposite end of the link 59 is pivotally connected to one arm of a bell-crank lever 61; and the other arm of the lever is pivotally connected to the front end of a rod 62. The lever 61 is pivoted on a suitable bracket 61a. The opposite or rear end of the rod 62 is connected to one arm 63a of a lever 63 which is pivoted upon the cross member 9 (see Fig. 2). Another arm 63b of the lever 63 is pivotally connected to the rear end of a link 64, which in turn is pivoted to an arm 65 fixed to a spindle or spindle hub of one of the wheels 2. The spindles for the front wheels 2 or the hubs thereof are provided with arms 66, which in turn are connected by a tie rod 67, whereby both wheels 2 are turned by the link 64 and arm 65. Another arm 63c of the lever 63 is pivotally connected at one end to a rod 68, which is pivotally connected at its opposite end to a lever 69 bolted or otherwise rigidly secured to a lug or extension 70 preferably formed integrally with the axle 37 (see Fig. 3) and extending laterally from the lower wall of the center section 41. The remaining arm 63d of the lever 63 is pivotally connected to one end of a rod 71; the other end of the latter is pivotally connected to a lever 72 which extends across the axle 37, being preferably pivoted or fulcrumed on the pivot pin 45 therefor and rotatively held thereon by a nut 73. The opposite or rear end of the lever 72 is connected by a link 74 (preferably a pair of links—see Fig. 4) to an arm 75, which in turn is rigidly connected to the axle 38, being preferably secured thereto by cap screws (see Fig. 3).

From the foregoing description it will be seen that I provide for steering of the traction wheels 2 and sets of trailing wheels 3, 4, simultaneously from a single lever mounted between the traction wheels and sets of trailing wheels; also that the connections from the main lever 63 extend to the lower side of one trailing wheel axle and to the upper side of the other trailing wheel axle, this arrangement providing for the turning of these axles without interference between the respective connections, so that the wheels 3, 4, can be steered in co-operative relation with each other and the traction wheels 2 to steer the truck.

In my construction I have so proportioned the levers and arms that when the wheels 2, 3, 4, are turned to their extreme steering position (see dotted lines in Fig. 2), the truck may be turned about the point A that is substantially the center of the circle which the truck would describe if turned completely around, so that in turning the wheels to a position less than their extreme position relatively little wear upon the tires result.

To those skilled in the art to which my invention relates many changes in construction and widely differing embodiments and applications thereof will suggest themselves without departing from the spirit and scope thereof. My disclosures and the description herein are purely illustrative and not in any sense limiting.

What I claim is:

1. In a truck of the class described, the combination of a frame, a pair of steerable traction wheels for said frame at one end thereof, an axle frame transversely trunnioned below the opposite end portion of said frame, forward and rearward axles mounted on said axle frame on opposite sides of its trunnions to swing about substantially vertical axes, each said axle being provided with a pair of load wheels at its opposite ends, and means for steering said traction and load wheels about a common center, said means comprising a main lever having three arms, connections between one of said arms and said traction wheels, connections between another of said arms and said forward axle, connections between the other said arm and the rearward axle and devices connected to said lever for operating it.

2. A construction as claimed in claim 1 in which the steering connections for one axle include a lever pivoted on an axis that intersects the axis of the other axle.

3. In a truck of the class described, the combination of a frame having a supporting member, a pair of steerable traction wheels, means for driving said wheels, an axle frame trunnioned on said frame on a transverse axis and having portions extending forwardly and rearwardly, an axle pivoted intermediate its ends on each of said axle frame portions, a set of trailing wheels mounted on each axle, a main lever mounted on said supporting member, means for turning said lever, and separate connections between said lever and said traction wheels and each axle arranged to simultaneously steer said wheels in co-operative relation.

4. In a truck of the class described, the combination of a frame, a pair of steerable traction wheels, means for driving said wheels, an axle frame trunnioned intermediate its ends on said frame and having centrally disposed forwardly and rearwardly longitudinally extending portions, axles pivoted intermediate their ends on the front and rear ends of said axle frame portions, trailing wheels mounted on said axles, and means for steering said traction wheels and swinging said axles to effect cooperative steering of said traction and trailing wheels.

5. In a truck of the class described, the combination of a frame, a pair of steerable wheels, means for driving said wheels, a longitudinal axle frame trunnioned intermediate its ends on said frame, axles pivotally connected intermediate their ends to the front and rear ends of said axle frame, trailing wheels carried by said axles, a lever mounted on said frame, means for operating said lever, operating connections between said lever and the axle on the front end of said axle frame for swinging it, a lever pivoted on said last mentioned axle, and connections between said first mentioned lever and said last mentioned lever and between the latter lever and the axle pivoted to the rear end of said axle frame.

6. A truck as claimed in claim 5, in which the operating connections with the axle on the front end of the axle frame are connected to it on one side of the latter and the operating connections for the other axle are connected to it on the opposite side of said axle frame.

7. In a truck of the class described, the combination of a frame, a pair of traction wheels, means for driving said wheels, an axle frame below said frame, axles pivotally connected intermediate their ends on the front and rear ends of said axle frame, means for trunnioning said axle frame on said frame on an axis arranged between said axles, trailing wheels mounted on the opposite ends of each of said axles, said trailing wheels being within the sides of said frame, a lever disposed between said traction wheels and said trailing wheels, means for operating said lever, steering connections between said lever and said traction wheels, steering connections between said lever and the lower side of one of said axles, and steering connections between said lever and the upper side of the other axle.

8. In an industrial truck, a frame comprising a main portion at one end and a load supporting portion at the other end disposed adjacent the ground, a platform surmounting said load supporting portion, a pair of power driven wheels beneath said main frame portion, a sub-frame member comprising a longitudinally extending section and laterally extending sections intermediate the ends of said longitudinal section, means for pivotally supporting the laterally extending sections on a transverse axis on said load supporting frame portion, axles pivotally mounted intermediate their ends on the opposite free ends of said longitudinally extending section, load wheels mounted on the opposite ends of each said axle, and means for simultaneously swinging said axles about their pivotal mountings on said longitudinally extending section.

9. In an industrial truck, a frame comprising a main portion at one end and a load supporting portion at the other end disposed adjacent the ground, a platform surmounting said load supporting portion, a pair of power driven wheels beneath said main frame portion, a sub-frame member comprising a longitudinally extending section and laterally extending sections intermediate the ends of said longitudinally extending section, means for pivotally supporting said laterally extending sections on a transverse axis on said load supporting frame portion, axles pivotally mounted intermediate their ends on the opposite free ends of said longitudinally extending section, load wheels mounted on the opposite ends of each said axle, and means for simultaneously swinging said load wheel axles about their pivotal mountings on said longitudinally extending section, said steering means including an arm rigidly connected to one of said load wheel axles, a link pivotally mounted on said sub-frame, an arm rigidly connected to the other load wheel axle, a connection between said link and the last mentioned arm and devices for operating said first mentioned arm and said link.

10. A truck as claimed in claim 9 in which the link of said steering means is pivoted on an axis coincident with the axis for one of said load wheel axles.

11. A truck as claimed in claim 9 in which the first mentioned arm of said steering connections is disposed on one side of one axle and the last mentioned arm is disposed on the opposite side of the other axle.

12. In an industrial truck, the combination of a frame having an elevated section and a relatively low load carrying section, a platform on said low frame section, knuckle mounted traction wheels below said elevated section, longitudinally spaced transverse axles, a longitudinally extending member trunnioned intermediate its ends on a fixed transverse axis on said low frame section below said platform, said transverse axles being pivotally mounted intermediate their ends on the free ends of said longitudinally extending member to swing in substantially horizontal planes and supporting relatively small load wheels on their outer ends within the lateral edges of said platform, and means for simultaneously swinging said traction wheels and said axles in directions to effect a co-operative relation between said traction and load wheels to steer the truck about a common center.

EDWARD H. REMDE.